W. E. TOMLINSON.
CAKE PAN.
APPLICATION FILED DEC. 31, 1915.

1,229,825. Patented June 12, 1917.

Witnesses
C. W. Bealle.
Wm. G. Windsor.

Inventor
W. E. Tomlinson.
By
Attorney

UNITED STATES PATENT OFFICE.

WILLIAM E. TOMLINSON, OF CANTON, OHIO.

CAKE-PAN.

1,229,825.  Specification of Letters Patent.  Patented June 12, 1917.

Application filed December 31, 1915. Serial No. 69,670.

*To all whom it may concern:*

Be it known that I, WILLIAM E. TOMLINSON, a citizen of the United States, residing at Canton, in the county of Stark and State of Ohio, have invented certain new and useful Improvements in Cake-Pans; and I do hereby declare the following to be a full, clear, and exact description of the invention, such as will enable others skilled in the art to which it appertains to make and use the same.

This invention relates to new and useful improvements in cake pans and one of its objects is the provision of a device of this character, which shall be simple, durable and efficient and which may be manufactured and sold at a comparatively low cost.

A further object of this invention is the provision of a false bottom, having a cake removing member slidably mounted thereon, to remove cake or pastry from the pan which has become adhered thereto, during the process of baking.

Another and more specific object of this invention is to provide the cake removing member with a portion that is offset downwardly to receive the false bottom and further provides it with its ends bent to provide loops to engage the edges of a pan to hold the false bottom therein and be capable of being moved along the edges of the pan, so that cake and other pastry within may be loosened from the pan and the false bottom.

With these and other objects in view as will become more apparent as the description proceeds, the invention consists in certain novel features of construction, combination and arrangement of parts as will be hereinafter described and claimed.

For a complete understanding of my invention, reference is to be had to the following description and accompanying drawing in which:—

Figure 1:
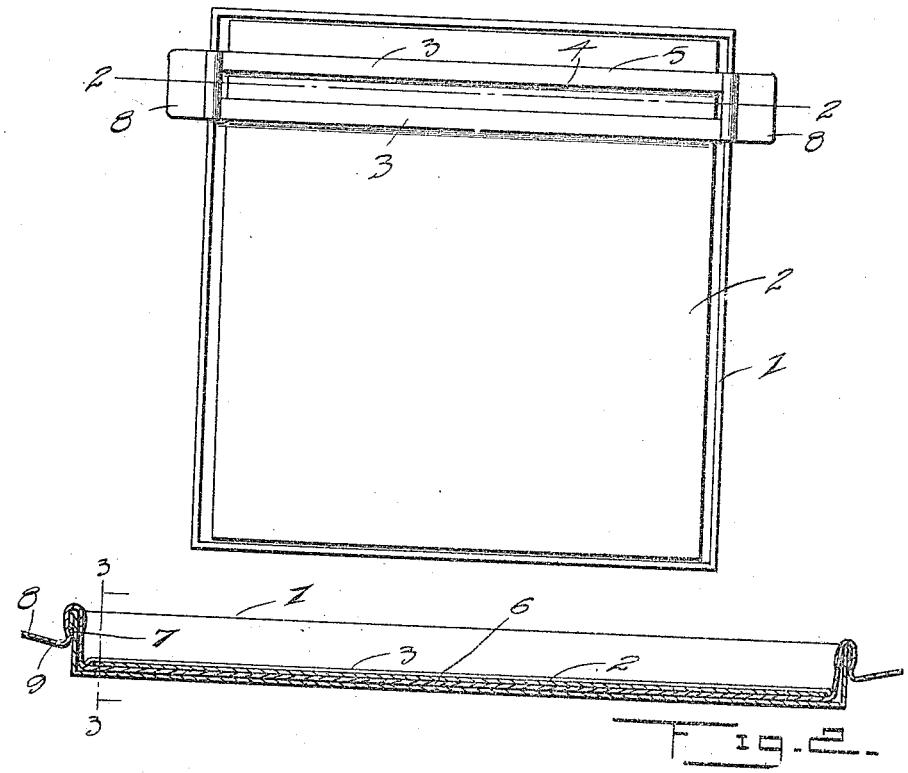
Figure 3:
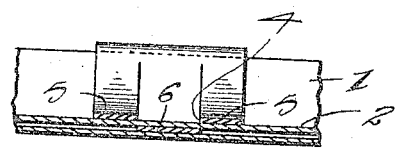
Figure 4:
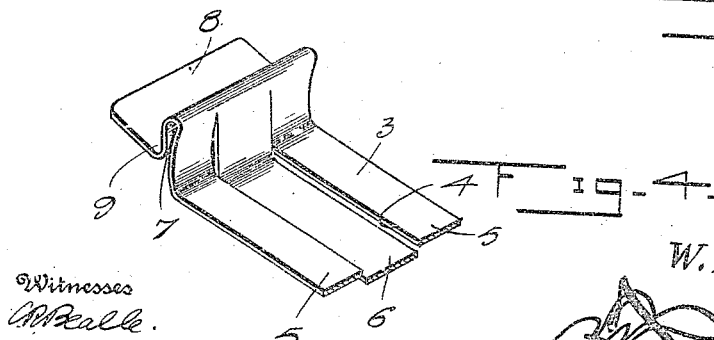

Figure 1 is a plan view of a cake pan, illustrating my invention applied thereto, Fig. 2 is a longitudinal sectional view, taken on the line 2—2 of Fig. 1, Fig. 3 is a detail transverse sectional view taken on the line 3—3 of Fig. 2, and Fig. 4 is a detail perspective view of one of the ends of the cake removing member, removed from a cake pan.

Referring in detail to the drawing, 1 indicates a cake or pastry pan of any desired construction or formation, constructed of metal or other suitable material, having mounted therein a false bottom 2 of metal or other suitable material which overlies the entire bottom of the cake pan 1.

A metal strip 3 is slotted and offset downwardly as illustrated at 4 to receive the false bottom 2 between the members 5 and 6 and which may be moved along the false bottom 2 as desired, providing a cake removing member which will act as a loosener or remover to any cake or pastry that adhere to the false bottom 2 during the process of baking. The ends 5 of the strip 3 are bent upwardly and downwardly to form loops 7 to engage the edges of the pan 1 and the free ends are bent laterally to provide extensions or handles 8 to move the strip 3 along the false bottom 2 as desired. The downwardly bent portions of the strip 3 are inclined inwardly as illustrated at 9 to frictionally engage the outer walls of the pan 1 to prevent the loops 7 from accidentally disengaging the edges of the pan 1 and the false bottom 2 from falling from the strip 3 during handling, when in an emptied condition.

In operation, when it is desired to remove cake or pastry from the pan 1 after baking, the operator pulls upon the handles 8 in the direction of himself, causing the loops 7 to travel along the edges of the pan 1 and the strip 3, which slides upon the false bottom 2 to slide in the same direction cutting or loosening any portion of the cake or pastry which may adhere to the pan 1 or false bottom 2. When it is desired to clean or wash the pan after baking, the loops 7 are sprung from an engagement with the sides of the pan 1 and the strip 3 is removed from the pan 1 carrying the false bottom 2 with it. The false bottom 2 may be pulled from between the members 5 and 6 and the various other parts heretofore described may be cleansed separately to remove all substances which may have adhered thereto during the process of baking or cooking.

While I have shown and described the preferred embodiment of my invention, it will be understood that minor changes in construction, combination and arrangement of parts may be made without departing from the spirit and scope of the invention as claimed.

Having thus described my invention, what I claim is:—

The combination with a cake pan, of a false bottom located within the pan and having the side edges thereof spaced from the side walls of the pan, a strip provided with a pair of parallel slots to form an intermediate offset portion and a pair of parallel outer members to receive the false bottom between the offset portion and the parallel outer members, the ends of said strip being bent upwardly and downwardly in an inclined plane to slidably engage the upper edges of the side walls of the pan, and laterally projecting extensions formed on the downwardly inclined ends of the strip to form handles for sliding the strip on the bottom.

In testimony whereof I affix my signature in presence of two witnesses.

WILLIAM E. TOMLINSON.

Witnesses:
LEO H. KOSTRACH,
A. G. TOMLINSON.

Copies of this patent may be obtained for five cents each, by addressing the "Commissioner of Patents, Washington, D. C."